US010142188B2

(12) United States Patent
Gravenites et al.

(10) Patent No.: US 10,142,188 B2
(45) Date of Patent: Nov. 27, 2018

(54) SYSTEM AND METHOD FOR PROVIDING GUIDING MESSAGES IN CREATING AN INTEGRATION FLOW IN A CLOUD-BASED INTEGRATION PLATFORM

(71) Applicant: Oracle International Corporation, Redwood Shores, CA (US)

(72) Inventors: Greg Gravenites, Littleton, CO (US); Rajan Modi, Highlands Ranch, CO (US); Colin Harsh, Redwood Shores, CA (US); Axel Allgeier, Denver, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 219 days.

(21) Appl. No.: 15/174,656

(22) Filed: Jun. 6, 2016

(65) Prior Publication Data

US 2016/0359690 A1    Dec. 8, 2016

Related U.S. Application Data

(60) Provisional application No. 62/171,157, filed on Jun. 4, 2015.

(51) Int. Cl.
*G06F 15/16* (2006.01)
*H04L 12/24* (2006.01)
(Continued)

(52) U.S. Cl.
CPC ............ *H04L 41/22* (2013.01); *G06F 3/0486* (2013.01); *G06F 3/04842* (2013.01);
(Continued)

(58) Field of Classification Search
None
See application file for complete search history.

(56) References Cited

U.S. PATENT DOCUMENTS 8,788,931 B1 * 7/2014 Chen .................. G06F 17/2264
715/234
2002/0116531 A1    8/2002 Chu
(Continued)

OTHER PUBLICATIONS

Oracle® Fusion Middleware, An Oracle White Paper, Simplifying Cloud Integration, Copyright © 2014, Jan. 2014, 18 pages.

*Primary Examiner* — Umar Cheema
*Assistant Examiner* — Gregory P Tolchinsky
(74) *Attorney, Agent, or Firm* — Tucker Ellis LLP

(57) ABSTRACT

In accordance with an embodiment, described herein is a system and method for generating messages guiding a user in creating an integration flow in a cloud-based integration service. The cloud-based integration service can include a web interface application for a current integration flow, and a runtime for executing the current integration flow. A plurality of complete integration flow definitions can be provided, each defining a plurality of integration components for a particular type of integration flow. The system can select a complete integration flow definition based on the type of the current integration flow, dynamically update the complete integration flow definition, and compare the current integration flow against the selected complete integration flow definition. Based on the comparison, the system can generate one or more messages for graphical display in the web interface application, to guide the user in creating the current integration flow.

18 Claims, 19 Drawing Sheets

(51) Int. Cl.
  *G06F 3/0486* (2013.01)
  *G06F 3/0484* (2013.01)
  *G06F 17/30* (2006.01)
  *H04L 29/08* (2006.01)
(52) U.S. Cl.
  CPC ........ *G06F 17/30896* (2013.01); *H04L 67/02* (2013.01); *H04L 67/10* (2013.01); *H04L 67/125* (2013.01)

(56) References Cited

U.S. PATENT DOCUMENTS

| | | | |
|---|---|---|---|
| 2009/0125833 A1* | 5/2009 | Abernethy, Jr. | G06F 3/0481 715/779 |
| 2010/0042670 A1* | 2/2010 | Kamalakantha | G06F 9/5072 709/203 |
| 2012/0030275 A1* | 2/2012 | Boller | G06F 17/30902 709/203 |
| 2014/0100922 A1 | 4/2014 | Aycock | |
| 2014/0129265 A1 | 5/2014 | Arena | |
| 2015/0082196 A1* | 3/2015 | Berger | G06Q 10/101 715/753 |
| 2015/0188973 A1* | 7/2015 | Kacmarcik | H04L 65/607 715/719 |
| 2016/0011905 A1 | 1/2016 | Mishra | |
| 2016/0182309 A1* | 6/2016 | Maturana | G06F 17/5009 709/224 |
| 2016/0196532 A1 | 7/2016 | De | |
| 2016/0359689 A1* | 12/2016 | Herreria | G06F 3/04847 |
| 2017/0054948 A1 | 2/2017 | Angel | |

\* cited by examiner

US 10,142,188 B2

SYSTEM AND METHOD FOR PROVIDING GUIDING MESSAGES IN CREATING AN INTEGRATION FLOW IN A CLOUD-BASED INTEGRATION PLATFORM

CLAIM OF PRIORITY

This application claims the benefit of priority to U.S. Provisional Application titled "SYSTEM AND METHOD FOR PROVIDING GUIDING MESSAGES FOR USE IN DESIGNING AN INTEGRATION CLOUD SERVICE INTEGRATION FLOW", Application No. 62/171,157, filed Jun. 4, 2015, which is herein incorporated by reference.

FIELD OF INVENTION

Embodiments of the invention are generally related to cloud services, and are particularly related to a system and method for providing guiding messages for creating an integration flow in a cloud-based integration service.

BACKGROUND

The rapid shift from on-premises applications to a hybrid mix of Software-as-a-Service (SaaS) and on-premises applications has introduced challenges for companies attempting to simplify enterprise application integration. Integration platform as a service (iPaaS) can provide a set of cloud-based tools to address these challenges. An iPaaS platform can provide a design time for users to design integration flows. Development of an integration flow can be a complex effort, requiring various components to be defined before the integration flow can be successfully deployed and executed. As such, it would be advantageous to provide a simple and intuitive way for non-technical persons to create integration flows.

SUMMARY

In accordance with an embodiment, the system can generate messages guiding a user in creating an integration flow in a cloud-based integration service. The cloud-based integration service can include a web interface application for a current integration flow, and a runtime for executing the current integration flow. A plurality of complete integration flow definitions can be provided, each defining a plurality of integration components for a particular type of integration flow. The system can select a complete integration flow definition based on the type of the current integration flow, dynamically update the complete integration flow definition, and compare the current integration flow against the selected complete integration flow definition. Based on the comparison, the system can generate one or more messages for graphical display in the web interface application, to guide the user in creating the current integration flow.

DETAILED DESCRIPTION

Integration platform as a service, for example, Oracle Integration Cloud Service (ICS), can provide a cloud-based platform for building and deploying integration flows that connect applications residing in the cloud or on-premises.

Figure 1:
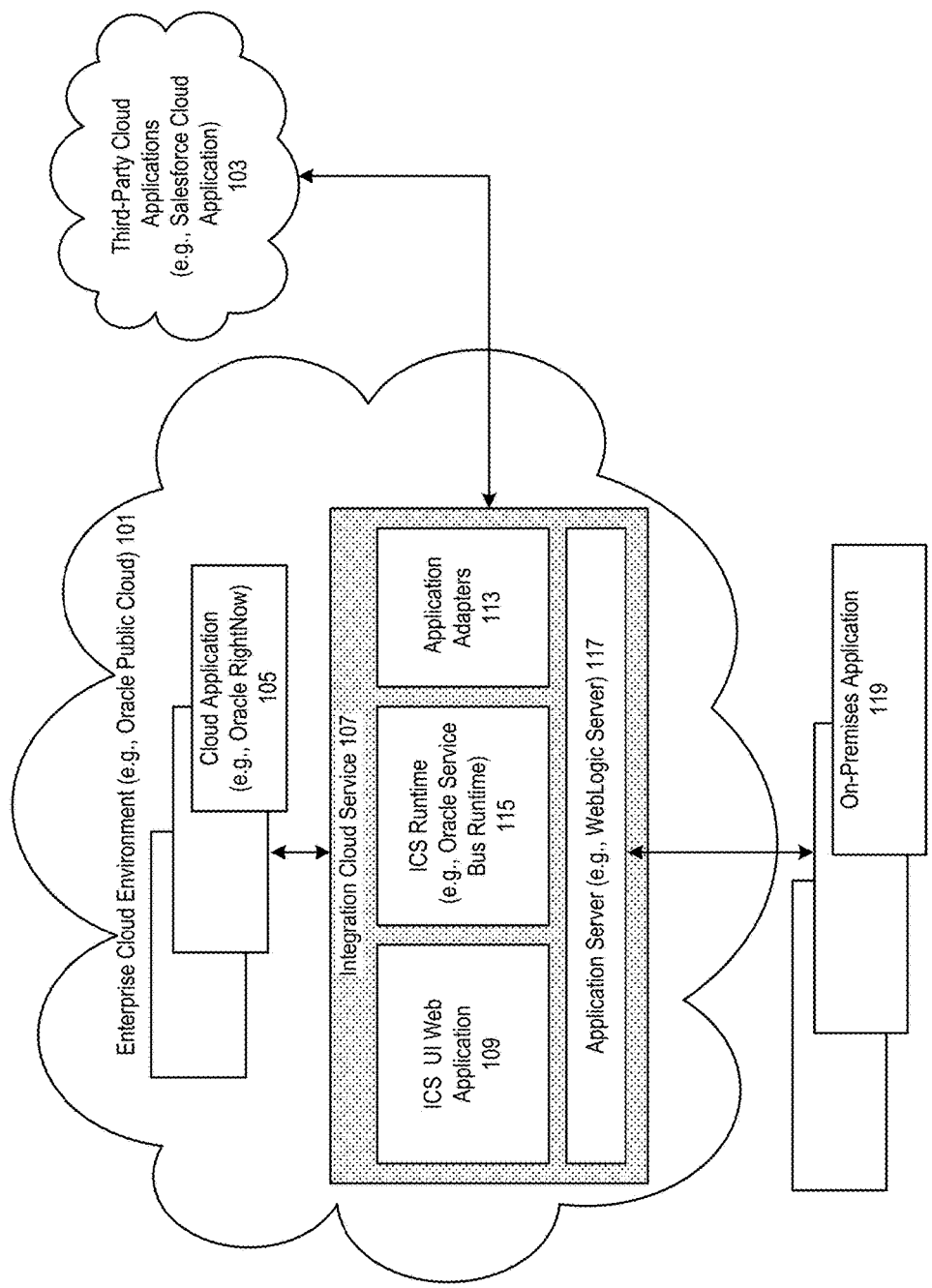
FIG. 1 illustrates an integration cloud service (ICS) in accordance with an embodiment.

FIG. 1 illustrates an integration cloud service in accordance with an embodiment.

As shown in FIG. 1, an ICS 107 can provide a cloud-based integration service for designing, executing, and managing ICS integration flows. The ICS can include a web application 109 and an ICS runtime 115 executing on an application server 117 in an enterprise cloud environment (for example, Oracle Public Cloud) 101. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 113 can be provided to simplify the task of configuring connections to a plurality of applications, by handling the underlying complexities of connecting to those applications. The applications can include enterprise cloud applications of the ICS vendor (for example, Oracle RightNow) 105, third-party cloud applications (for example, Salesforce) 103, and on-premises applications 119. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service.

Figure 2:
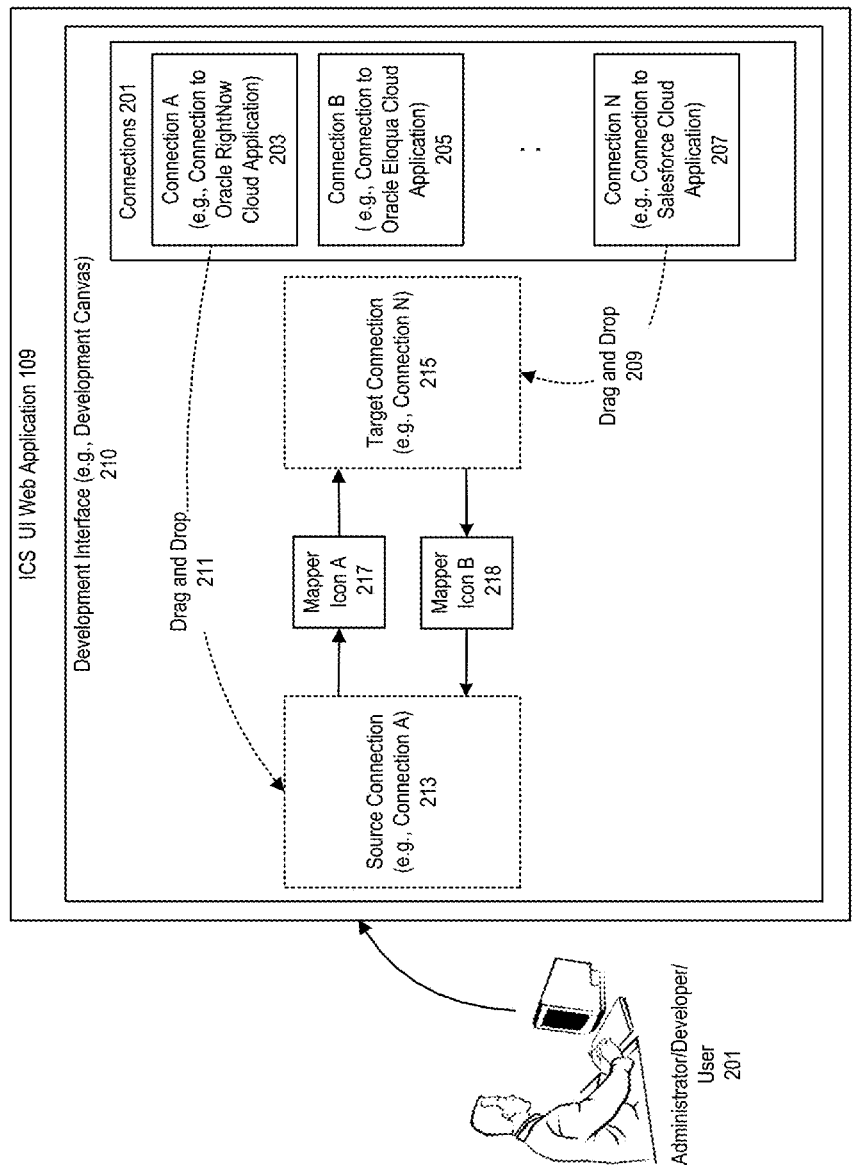
FIG. 2 illustrates an ICS design time, in accordance with an embodiment.

FIG. 2 illustrates an ICS design time, in accordance with an embodiment.

In accordance with an embodiment, a development interface (e.g., a development canvas) 210 in the web UI application can be used by a user to create an ICS integration flow, using a plurality of existing connections 201, for example, connection A 203, connection B 205 and connection N 207.

As shown in FIG. 2, a particular connection (for example, connection A) can be dragged and dropped 211 to the development interface as a source connection 213, and connection N can be dragged and dropped 209 to the development interface as a target connection 215. The source connection can include information required to connect to a source application, and can be used by the ICS to receive requests from the source application (for example, an Oracle RightNow cloud application). The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 217 and mapper icon B 218) can be displayed for use in opening the mappers, so that the user can define how information is transferred between a source and target data data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

As such, it would be advantageous to provide guiding messages for a user to follow in designing an integration flow.

Completeness Indicator for an Integration Flow

In accordance with an embodiment, the system can be used to graphically display a completeness indicator for a current integration flow being defined in a cloud-based integration service comprising a web user interface for designing the current integration flow and a runtime for executing the integration flow. A plurality of integration flow definitions can be provided, each defining a plurality of integration components for a particular type of integration flow. The system can compare one or more integration components in the current integration flow, against a plurality of integration components in a definition for a particular type of integration flow, taking into account the relative weighting of each integration component. A value reflecting the level of completeness of the current integration flow can be generated based on the comparison, and graphically displayed as a completeness indicator in the web interface application.

In accordance with an embodiment, the complete integration flow definition can be dynamically updated based on a currently defined integration component in the development interface.

In accordance with an embodiment, the level of the completeness of the current integration flow can be displayed as a gauge together with a numerical percentage value, so that a user can determine when an integration flow is complete, and ready to be moved to the next stage of the development life cycle (e.g., deployment). The current integration flow is complete when all required integration components in the complete integration flow definition are properly defined.

In accordance with an embodiment, at any point in time during the editing session when the current integration flow is not yet complete, an additional indicator can be overlaid on the gauge indicating that additional end-user help is available. Clicking on the gauge can prompt the system to display the additional steps required to complete the current integration flow.

The features described above can be applied to the development of other objects (for example, connections) in the cloud-based integration service.

Figure 3:
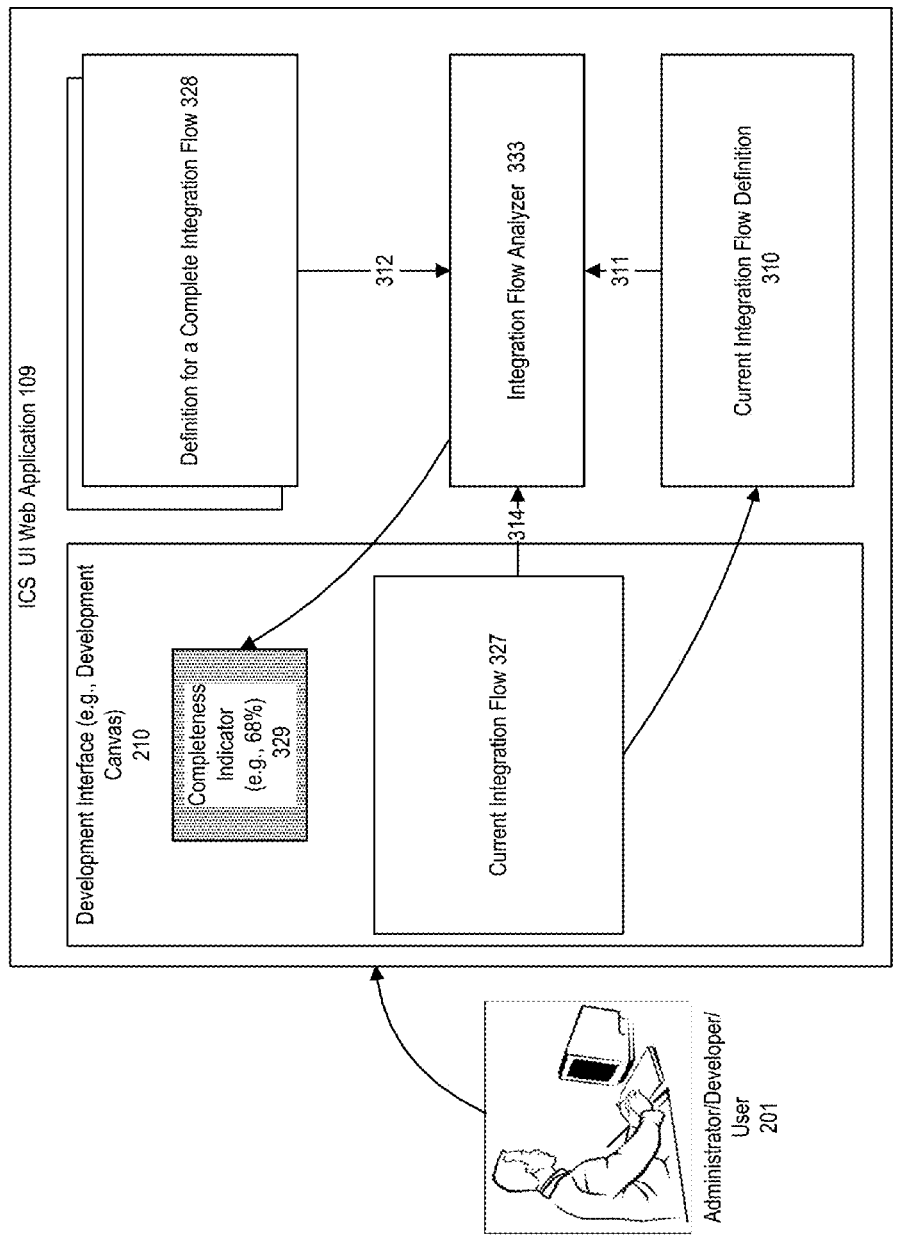
FIG. 3 illustrates a system for graphically displaying a completeness indicator for an integration flow in an ICS, in accordance with an embodiment.

FIG. 3 illustrates a system for graphically displaying a completeness indicator for an integration flow in an ICS, in accordance with an embodiment.

As shown in FIG. 3, the system can include a plurality of complete integration flow definitions, for example, a complete integration flow definition 328, each complete integration flow definition including a plurality of integration components for a particular type of integration flow, for example, a data mapping integration flow, a subscribing integration flow, or a publishing integration flow.

In accordance with an embodiment, as an integration component is being defined in a current integration flow 327, the integration component can be saved into a definition file 310 for the current integration flow. The save action can trigger 314 an integration flow analyzer to retrieve 311 all defined integration components in the definition file, retrieve 312 the plurality of integration components in a complete integration flow definition, and compare the two sets of integration components. Based on the comparison, a percentage value can be generated and graphically displayed as a completeness indicator 329 in the development interface.

In accordance with an embodiment, the complete integration flow definition can be selected by the system based on the type of the current integration flow.

Figure 4:
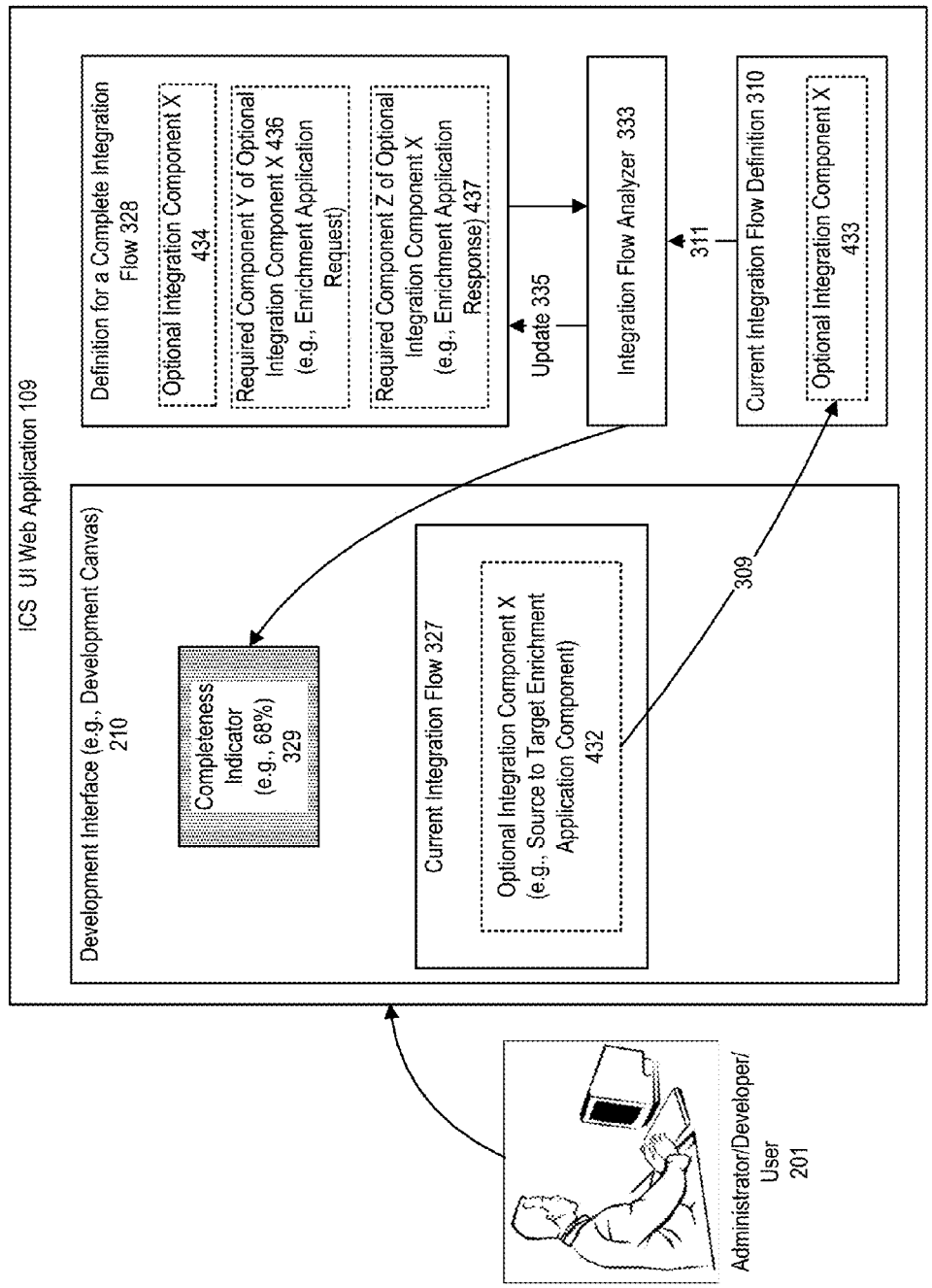
FIG. 4 further illustrates a system for graphically displaying a completeness indicator for an integration flow, in accordance with an embodiment.

FIG. 4 further illustrates a system for graphically displaying a completeness indicator for an integration flow, in accordance with an embodiment.

In accordance with an embodiment, the completeness of the current integration flow can be calculated based on an algorithm in which integration components defined in the complete integration flow definition (i.e. required integration components) are automatically factored into the calculation, whereas those integration components not defined in the complete integration flow definition (i.e. optional integration components) are not automatically factored into the calculation.

However, if an optional integration component is defined that in turn requires one or more additional integration components to be defined, the optional component and the additional integration components can be factored into the calculation.

As shown in FIG. 4, a user can optionally define an optional integration component X 432, for example, a source to target enrichment application component, which is an integration component used to call another service to enhance data from a source application to a target application.

In accordance with an embodiment, this optional integration component X requires other components to be defined, for example, an enrichment application request and an enrichment application response. As such, when the optional integration component 433 is saved, the integration flow analyzer can update the complete integration flow definition with the optional integration component X 434, and a required component Y 436, and a required component Z 437. The integration components X, Y and Z can all be factored into the completeness calculation.

Figure 5:
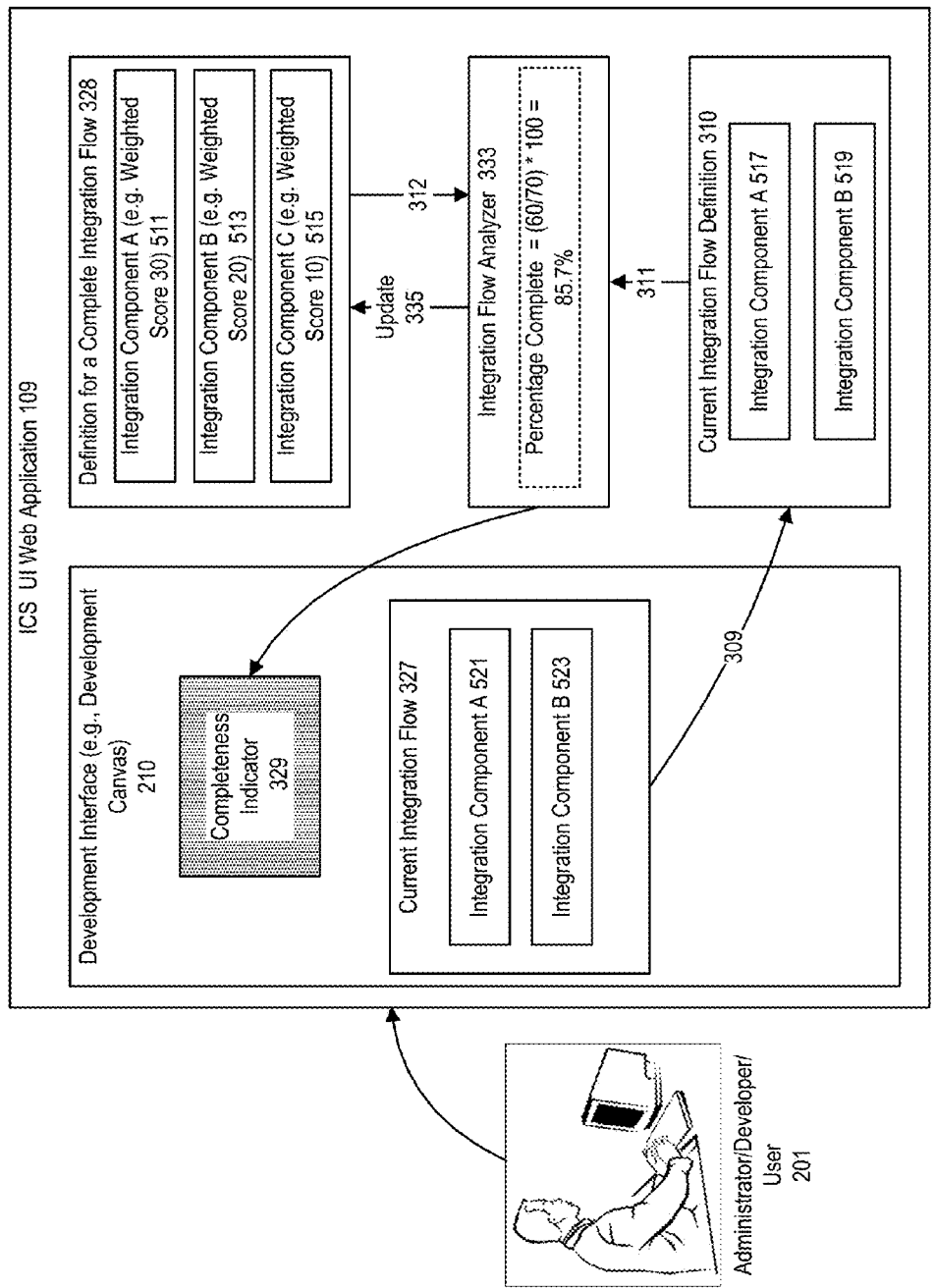
FIG. 5 further illustrates a system for graphically displaying a completeness indicator for an integration flow in an ICS, in accordance with an embodiment.

FIG. 5 further illustrates a system for graphically displaying a completeness indicator for an integration flow in an ICS, in accordance with an embodiment.

In accordance with an embodiment, when calculating the completeness of an integration flow, the integration flow analyzer may not equally weight all integration components. An integration component that requires little effort to be properly defined relative to others may factor less into the calculated percentage value.

As shown in FIG. 5, a complete integration flow definition can include a plurality of integration components that are defined with a different weighted score, reflecting different efforts required for a user to properly defined that integration component.

For example, integration component A 511 has a weighted score 30, integration component B 513 has a weighted score 20, and integration component C 515 has a weighted score 10.

In accordance with an embodiment, integration component A 521 and integration component B 523 can be defined for the current integration flow, and saved into the definition file for the current integration flow as integration component A 517 and integration component B 519. The integration flow analyzer can compare the total score of the defined integration components for the current integration flow, and the total score of all integration components in the complete integration flow definition.

For example, the percentage complete can be calculated as (60/70)*100=85.7%, where 60 is the total score of the integration components that have been defined for the current integration flow, and 70 is the total score of all integration components in the complete integration flow definition.

FIGS. 6A-6G illustrate an algorithm for calculating a percentage value for the completeness of an integration flow, in accordance with an embodiment.

Figure 6A:
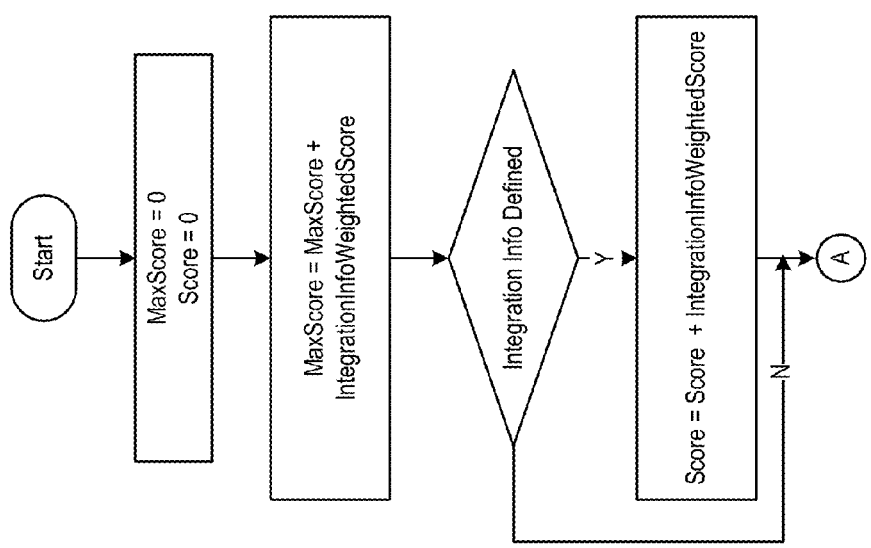
FIGS. 6A-6G illustrate an algorithm for calculating a percentage value for the completeness of an integration flow, in accordance with an embodiment.
Figure 6B:
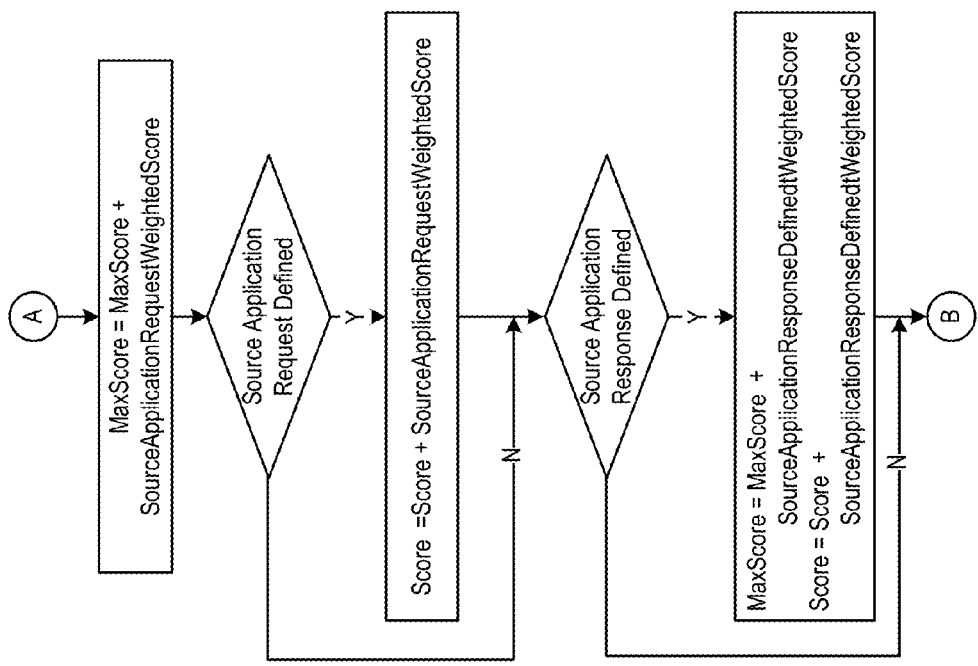
Figure 6C:
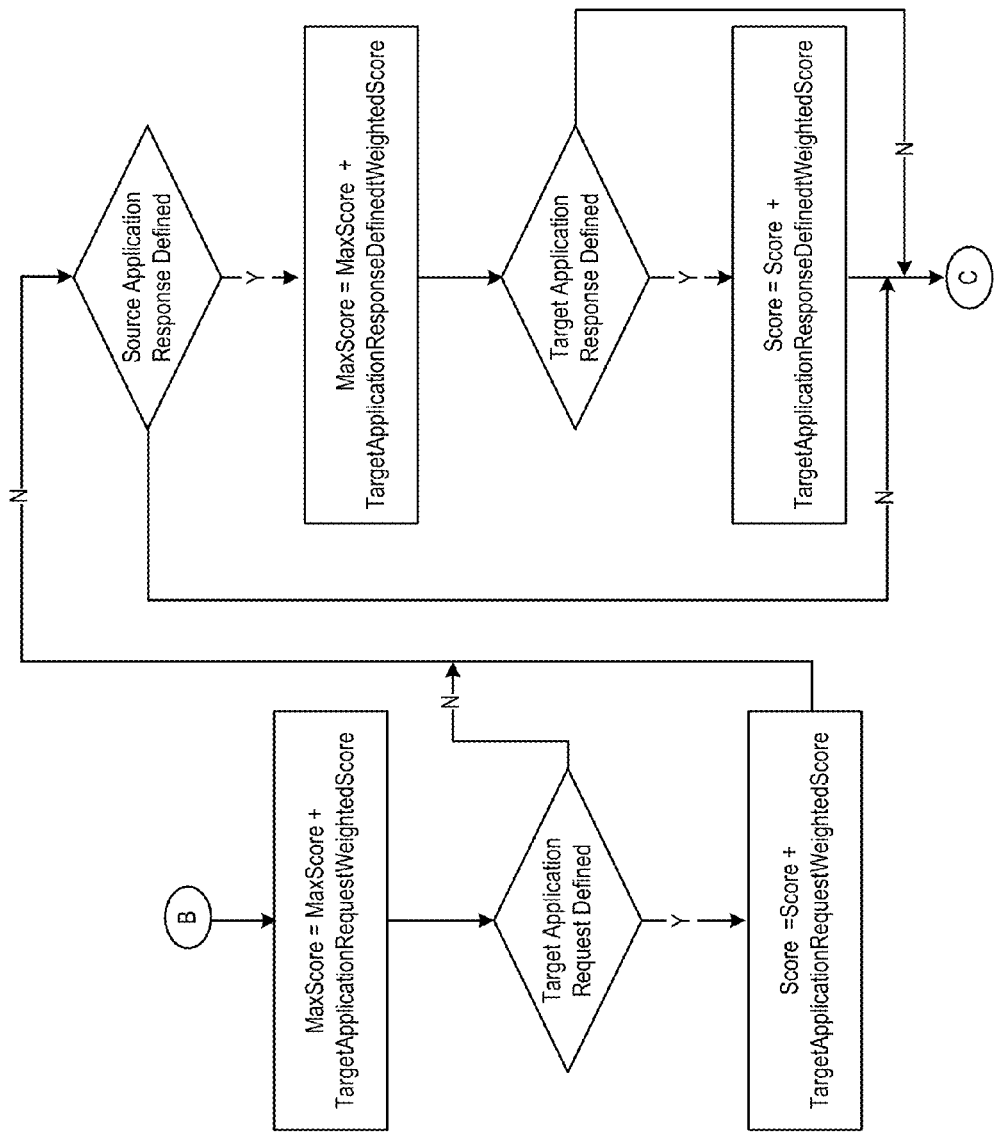
Figure 6D:
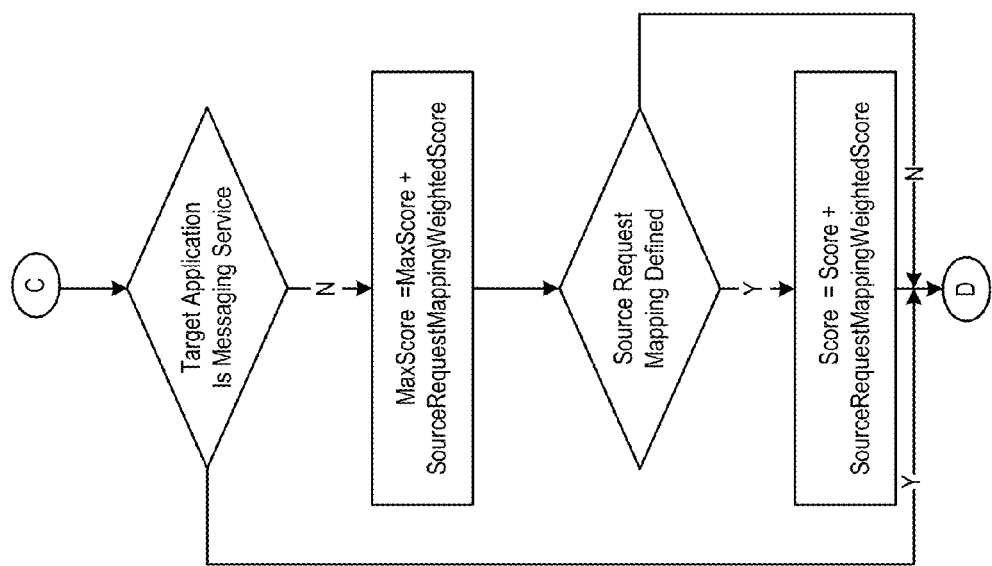
Figure 6E:
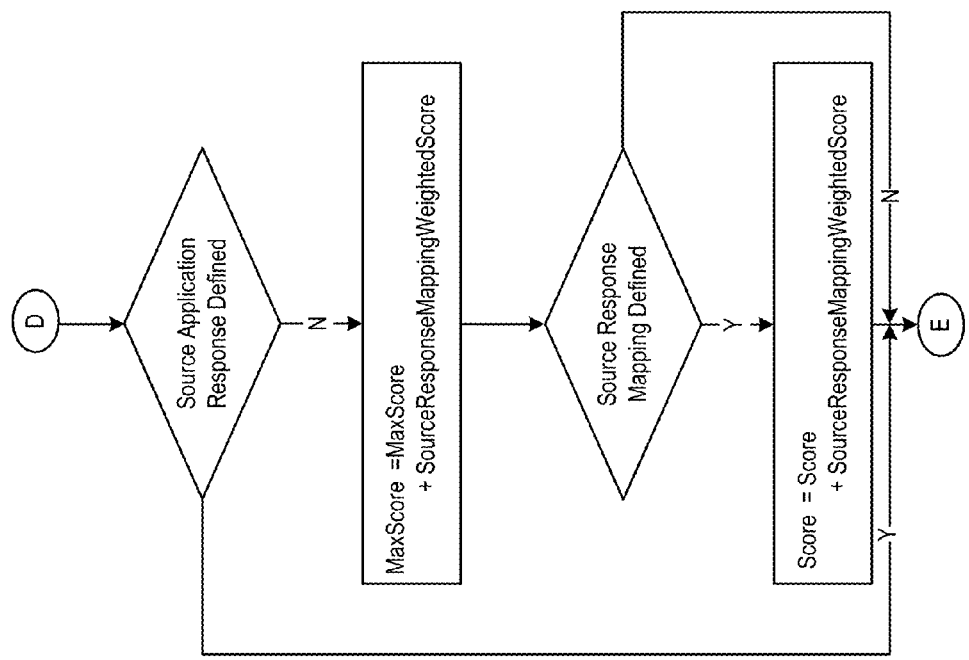
Figure 6F:
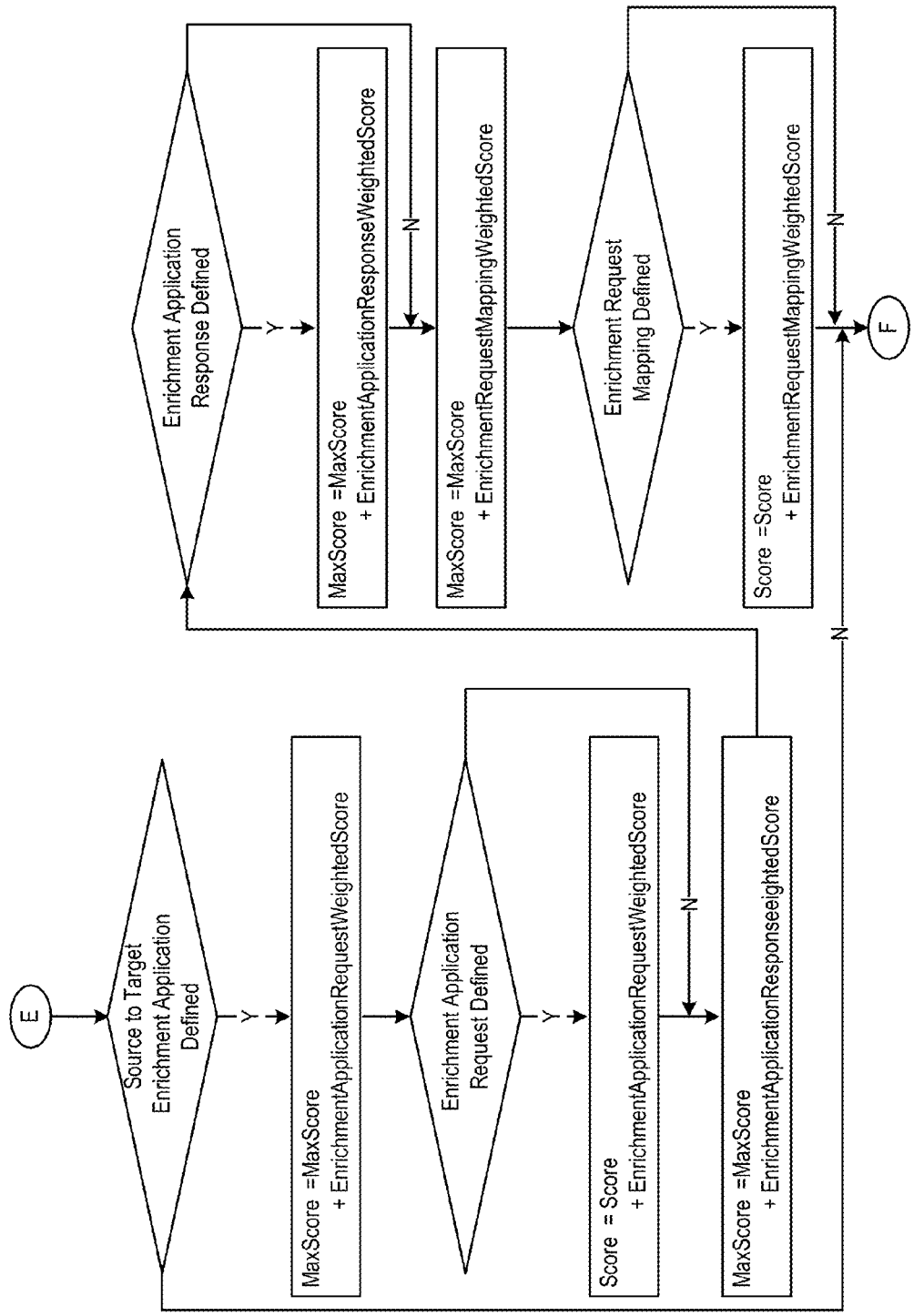
Figure 6G:
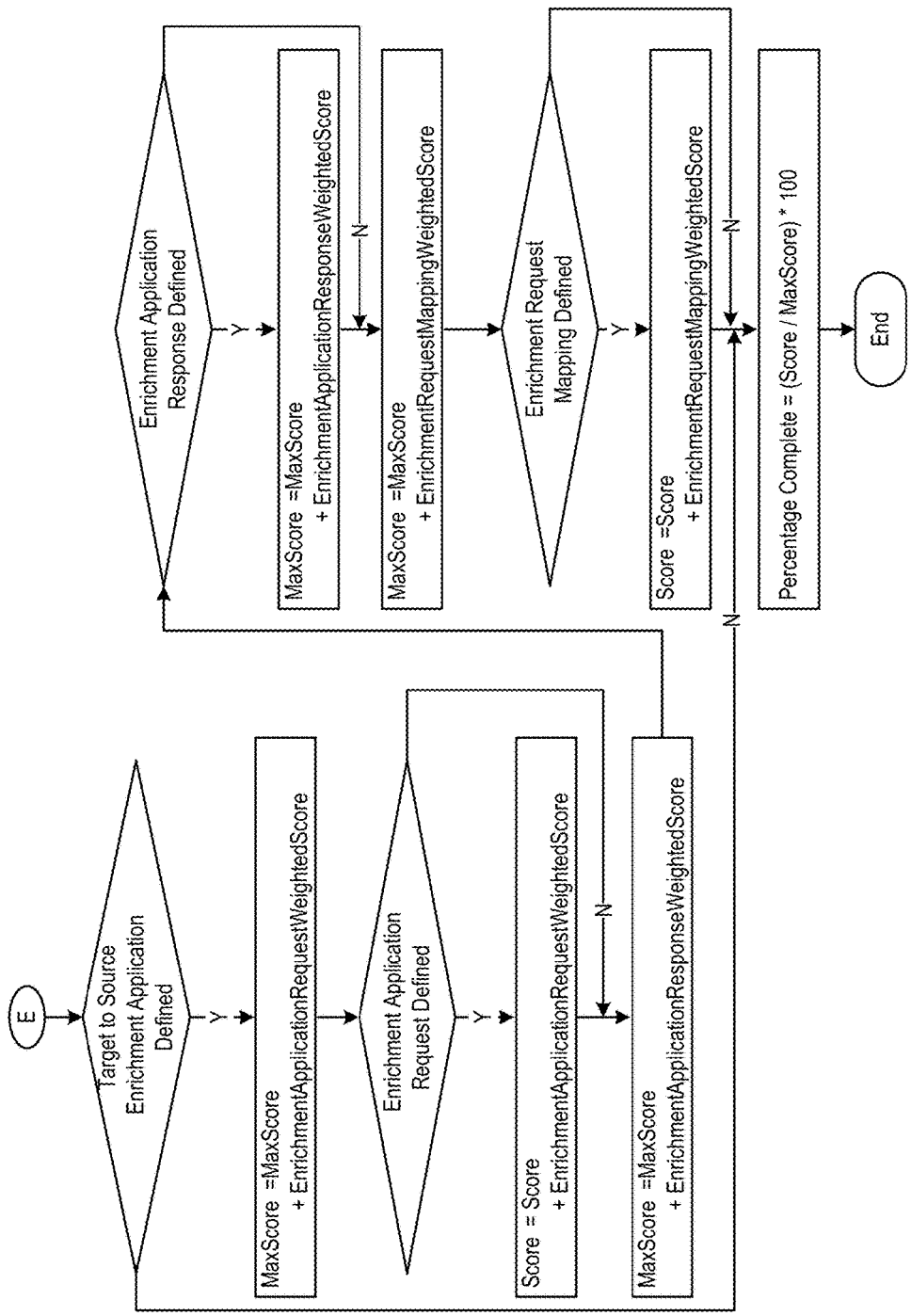

As shown in FIGS. 6A-6B, a plurality of integration components, including required integration components and optional integration components, can be factored into the calculation of the completeness of an integration flow.

In accordance with an embodiment, a first variable (for example, "MaxScore") can be used to represent the total score for all integration components in a complete integration flow definition, and a second variable (for example, "Score") can be used to represent the total score for those integration components that have been defined by the user for the current integration flow.

In accordance with an embodiment, the system can divide the second variable by the first variable to get a percentage value for the completeness of the current integration flow.

Figure 7:
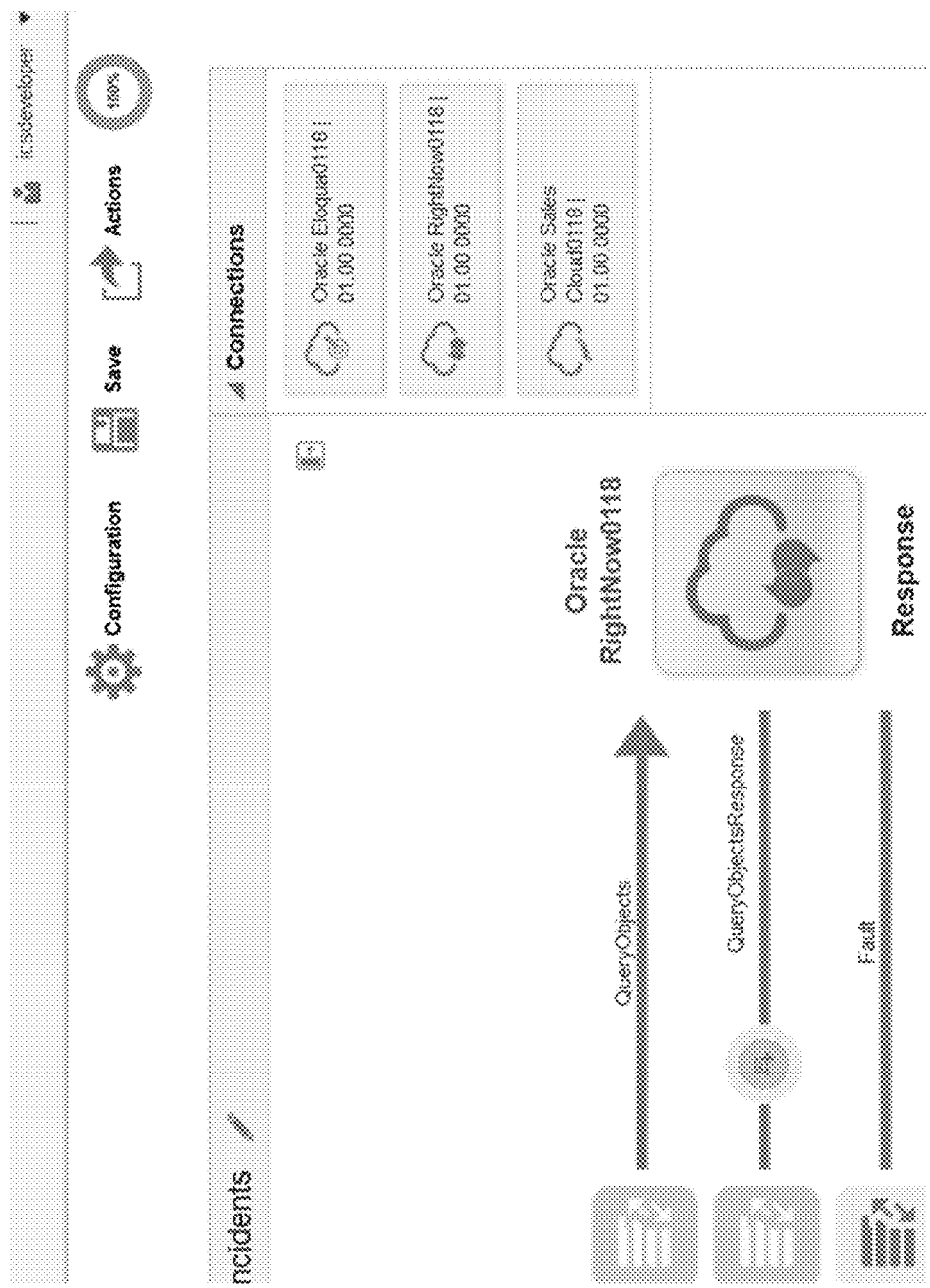
FIG. 7 shows a completeness indicator indicating that an integration flow has been completely defined, and is ready to be moved to the next stage of the development life cycle, for example, integration flow activation, in accordance with an embodiment.

FIG. 7 shows a completeness indicator indicating that an integration flow has been completely defined, and is ready to be moved to the next stage of the development life cycle, for example, integration flow activation, in accordance with an embodiment.

Figure 8:
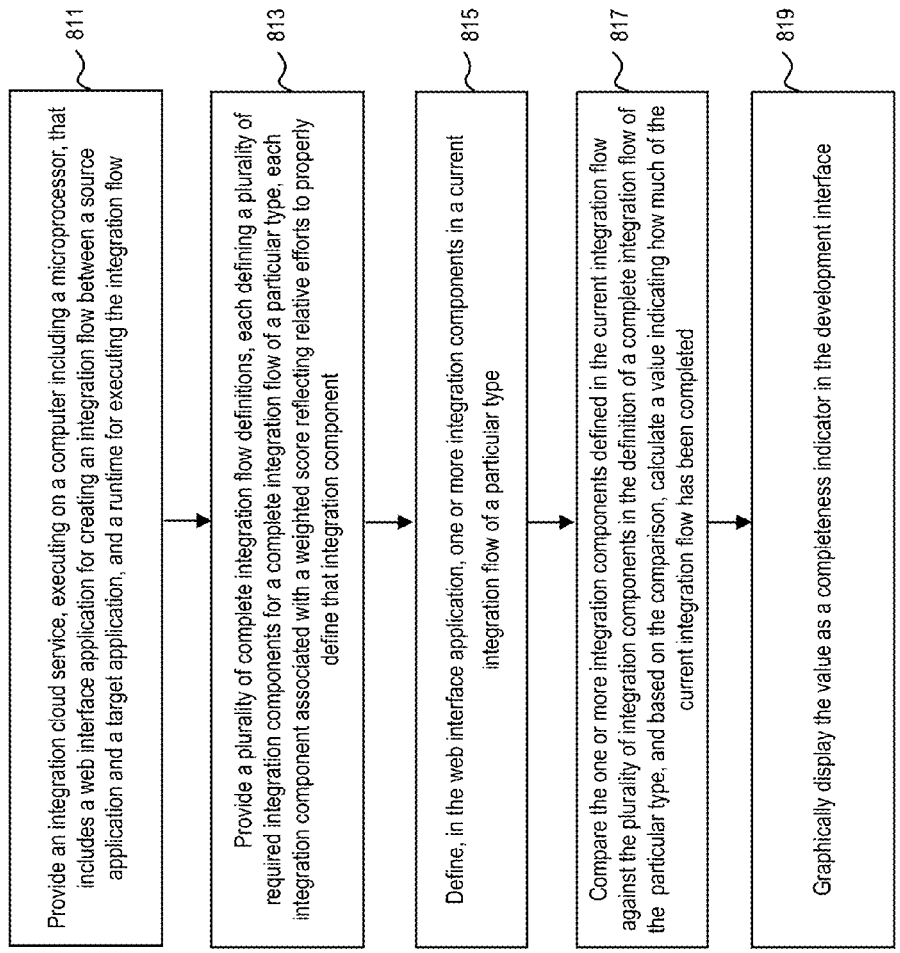
FIG. 8 illustrate a method for graphically displaying a completeness indicator for an integration flow in an ICS, in accordance with an embodiment

FIG. 8 illustrate a method for graphically displaying a completeness indicator for an integration flow in an ICS, in accordance with an embodiment.

As shown in FIG. 8, at step 811, an integration cloud service is provided on a computer including a microprocessor, wherein the integration cloud service includes a web interface application for creating an integration flow between a source application and a target application, and a runtime for executing the integration flow.

At step 813, a plurality of complete integration flow definitions are provided, each defining a plurality of required integration components for a complete integration flow of a particular type, each integration component associated with a weighted score reflecting relative efforts to properly define that integration component.

At step 815, one or more integration components are defined for a current integration flow of a particular type in the web interface application.

At step 817, an integration flow analyzer compares the one or more integration components defined for the current integration flow, against the plurality of integration components in the definition of a complete integration flow of the particular type, and based on the comparison, calculates a value indicating how much of the current integration flow has been completed.

At step 819, the value is graphically displayed as a gauge and/or numerically as a percentage value in the development interface.

Guiding a User in Creating an Integration Flow

In accordance with an alternative embodiment, the system can generate messages guiding a user in creating an integration flow in a cloud-based integration service. The cloud-based integration service can include a web interface application for creating and a runtime for executing the current integration flow. A plurality of complete integration flow definitions can be provided, each defining a plurality of integration components for a particular type of integration flow. The system can select a complete integration flow definition based on the type of the current integration flow, dynamically update the complete integration flow definition, and compare the current integration flow against the selected complete integration flow definition. Based on the comparison, the system can generate one or more messages for graphical display in the web interface application, to guide the user in creating the current integration flow.

In accordance with an embodiment, through the comparison, the system can determine which integration components defined in the complete integration flow definition are yet to be defined in the current integration flow, and dynamically construct messages instructing the user to define those integration components.

In accordance with an embodiment, the plurality of integration components defined in each complete integration flow definition can include any of the integration components described in FIGS. 6A-6G.

For example, these integration components can include a source application request, a source application response, a target application request, and a target application response.

In accordance with an embodiment, in dynamically updating a complete integration flow definition, the system can use the logic flow described in FIGS. 6A-6G, excluding the portions directed to score calculations.

Figure 9:
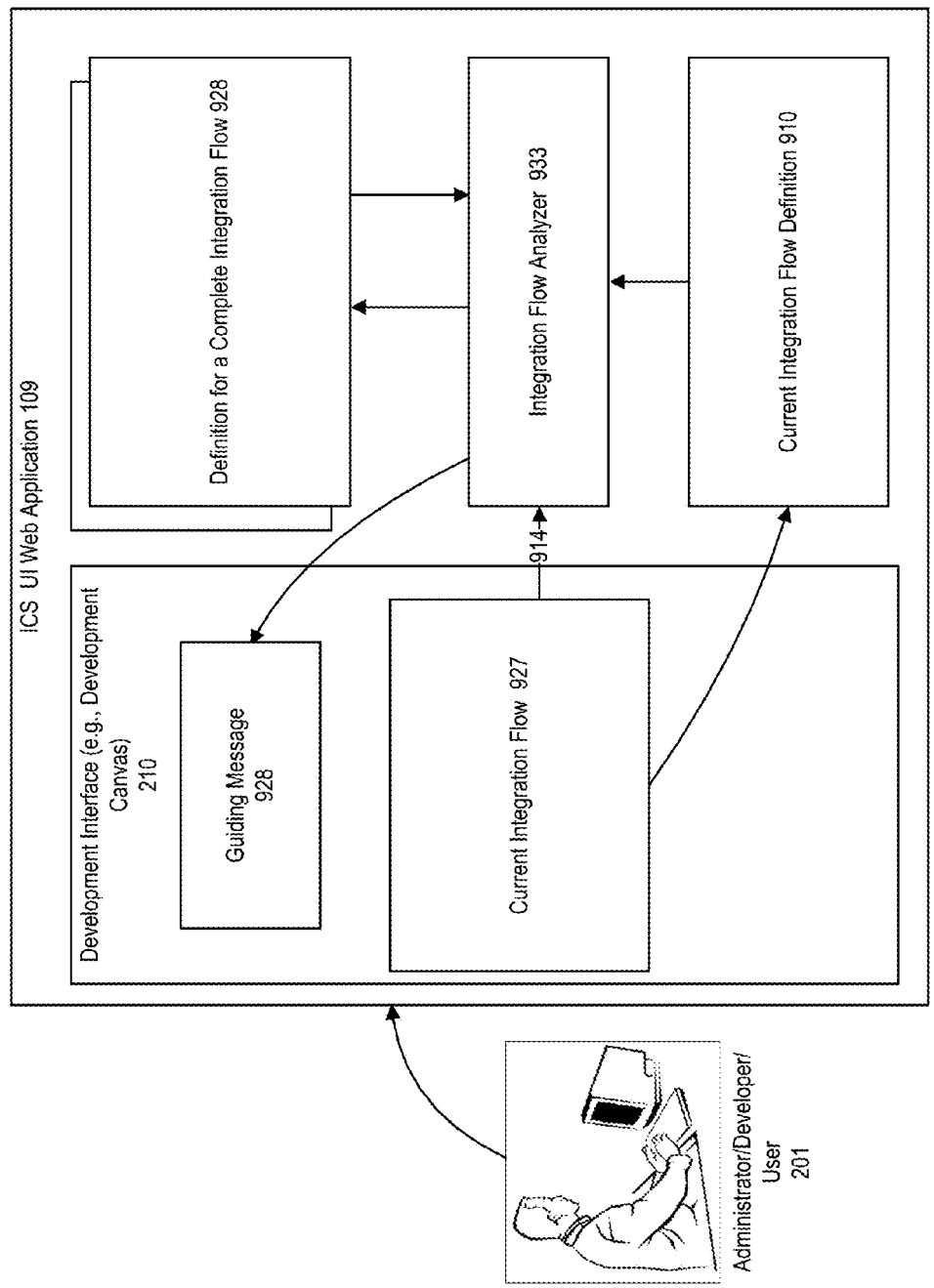
FIG. 9 illustrates a system for generating messages guiding a user in creating an integration flow in an ICS design time, in accordance with an embodiment.

FIG. 9 illustrates a system for generating messages guiding a user in creating an integration flow in an ICS design time, in accordance with an embodiment.

As show in FIG. 9, the system includes a plurality of complete integration flow definitions, for example, a complete integration flow definition 928. Each complete integration flow definition can define a particular type of integration flow, and include a plurality of required integration components for the particular type of integration flow.

In accordance with an embodiment, the system can determine the type of a current integration flow 927 being defined in the development interface, and select a complete integration flow definition to match the type. As the current integration flow is being defined, one or more integration components in the current integration flow can be saved into a current integration flow definition 910. Each time an integration component is being saved, an integration flow analyzer 933 can be triggered 914 to compare the current integration flow against the selected complete integration flow.

In accordance with an embodiment, based on the comparison, the system can determine which integration component in the complete integration flow has not been defined in the web interface application, and generate a guiding message 928 for graphical display in the development interface.

In accordance with an embodiment, when a user creates the current integration flow, the current integration flow definition may not include any integration component. As such, the system can display messages such as "drag and drop a source" and "drag and drop a target" to guide the user where to start in creating the integration flow.

As the integration flow is being defined, the current integration flow definition can be updated to dynamically reflect the progress of the current integration flow. As such, each time a newly defined integration component is saved, the guiding message generated can be different, reflecting the current state of the current integration flow, and which integration components are needed to complete the current integration flow.

Figure 10:
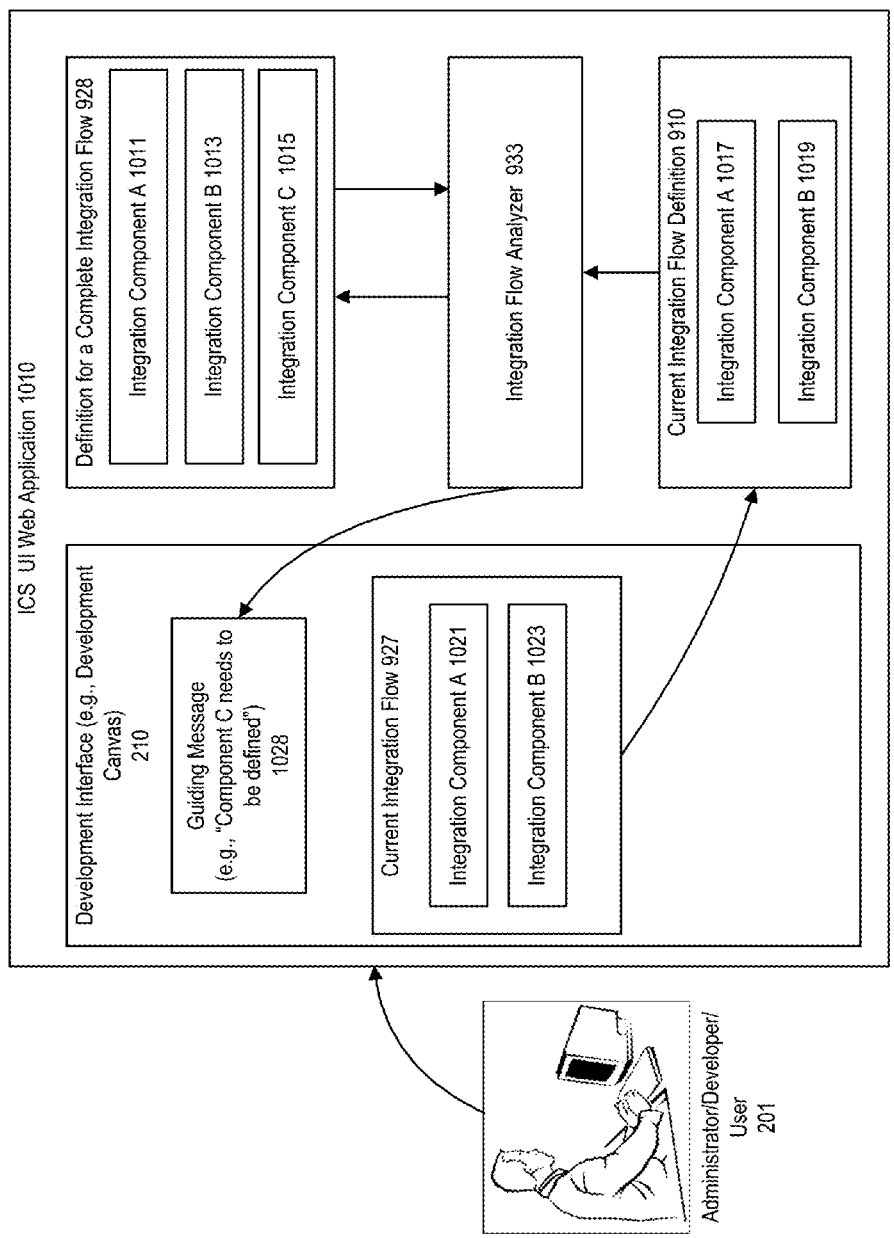
FIG. 10 further illustrates a system for graphically displaying guiding messages for completing an integration flow in an ICS, in accordance with an embodiment.

FIG. 10 further illustrates a system for generating messages guiding a user in creating an integration flow in an ICS design time, in accordance with an embodiment.

As shown in FIG. 10, a complete integration flow definition can include a plurality of integration components, for example, integration component A 1011, integration component B 1013, and integration component C 1015.

In accordance with an embodiment, as integration component A 1021 and integration component B 1023 are defined and saved into the current integration flow definition as integration component A 1017 and integration B 1019, the integration flow analyzer can compare the defined integration components for the current integration flow against the complete integration flow definition, and generate a guiding message (for example, "Component C needs to be defined") 1028 for graphical display in the development interface.

In accordance with an embodiment, integration components defined in the complete integration flow definition (i.e. required integration components) are automatically used in the comparison to generate guiding messages, whereas those integration components not defined in the complete integration flow definition (i.e. optional integration components) are not automatically used.

However, if an optional integration component is defined that in turn requires one or more additional integration components to be defined, the complete integration flow definition can be updated with the optional integration component and the additional integration components, so that they can be used as a basis for generating guiding messages.

Figure 11A:
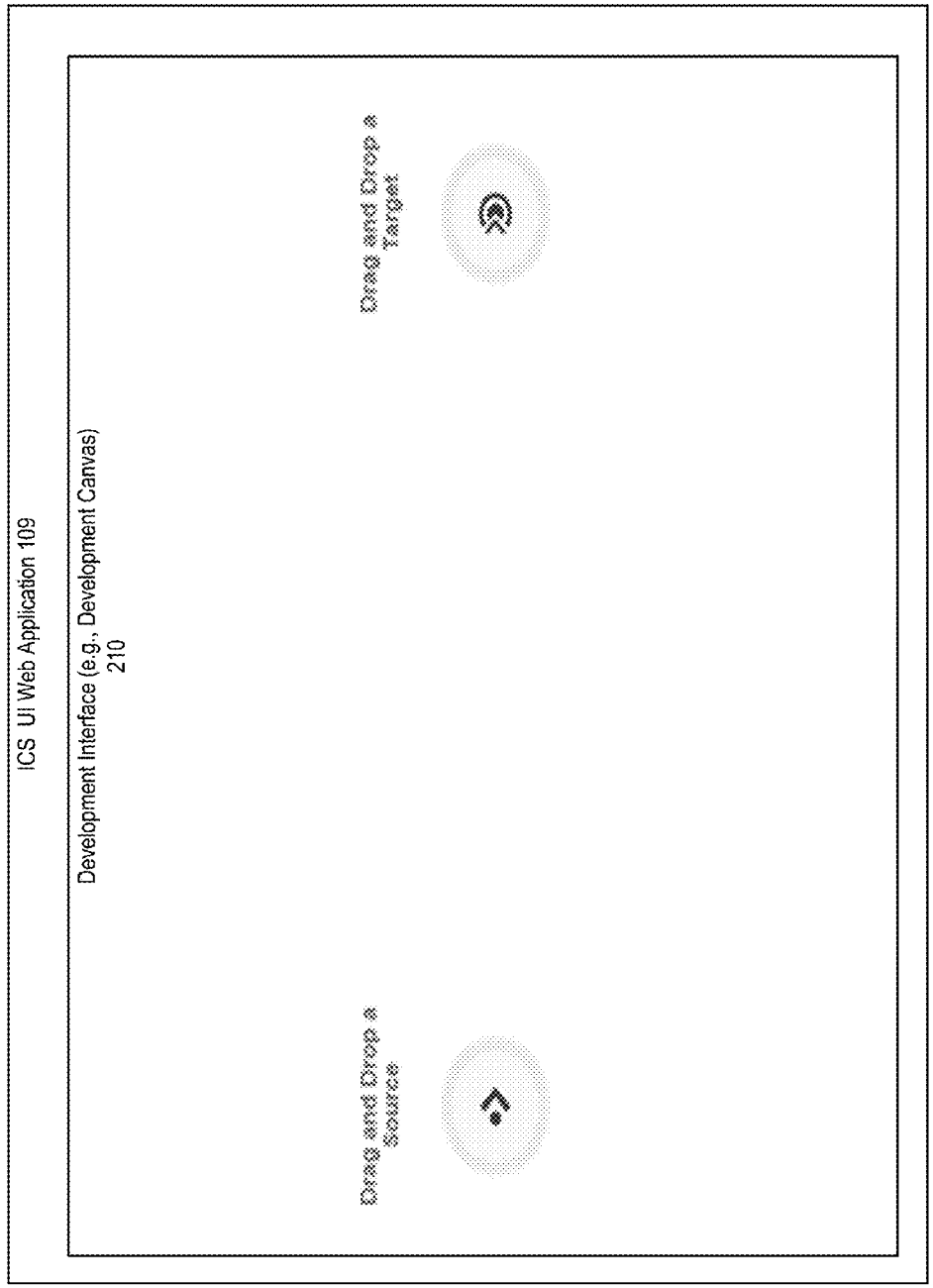
FIGS. 11A-11B illustrate exemplary guiding messages in creating an integration flow in a web user interface of a cloud-based integration service, in accordance with an embodiment.
Figure 11B:
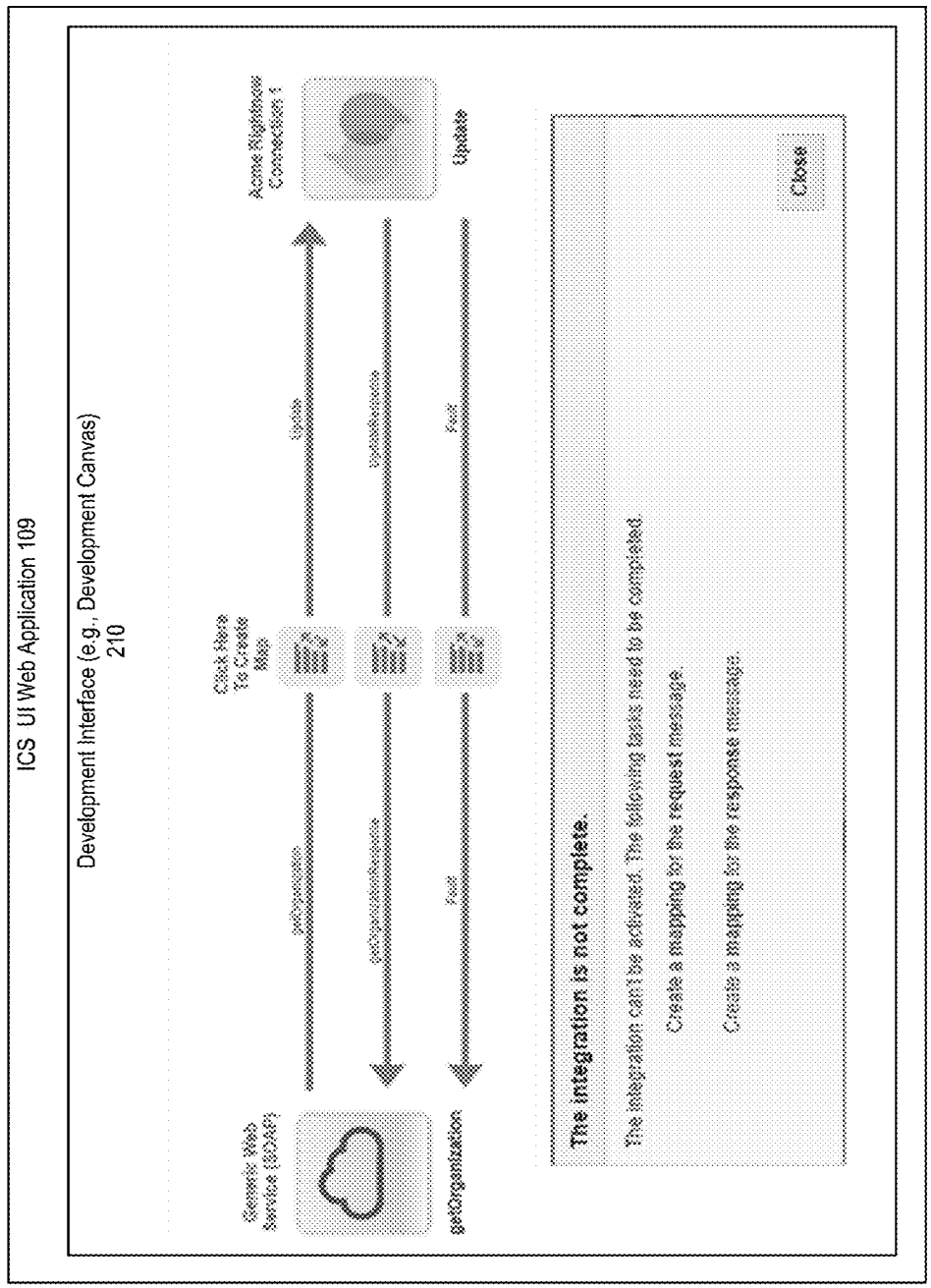

FIGS. 11A-11B illustrate exemplary guiding messages in creating an integration flow in a web user interface of a cloud-based integration service, in accordance with an embodiment.

As shown in FIG. 11A, when a user first starts a new integration flow, the system can generate guiding messages to instruct the user to drag and drop a source and target connection onto the development interface. The system generates these guiding messages by comparing an empty flow definition against a complete integration flow definition selected based on the type of the new integration flow.

In FIG. 11B, a plurality of integration components have been defined in the development interface. However, a mapping for a request message or response message has not been defined yet. The system can generate a guiding message for the user to complete these mappings.

Figure 12:
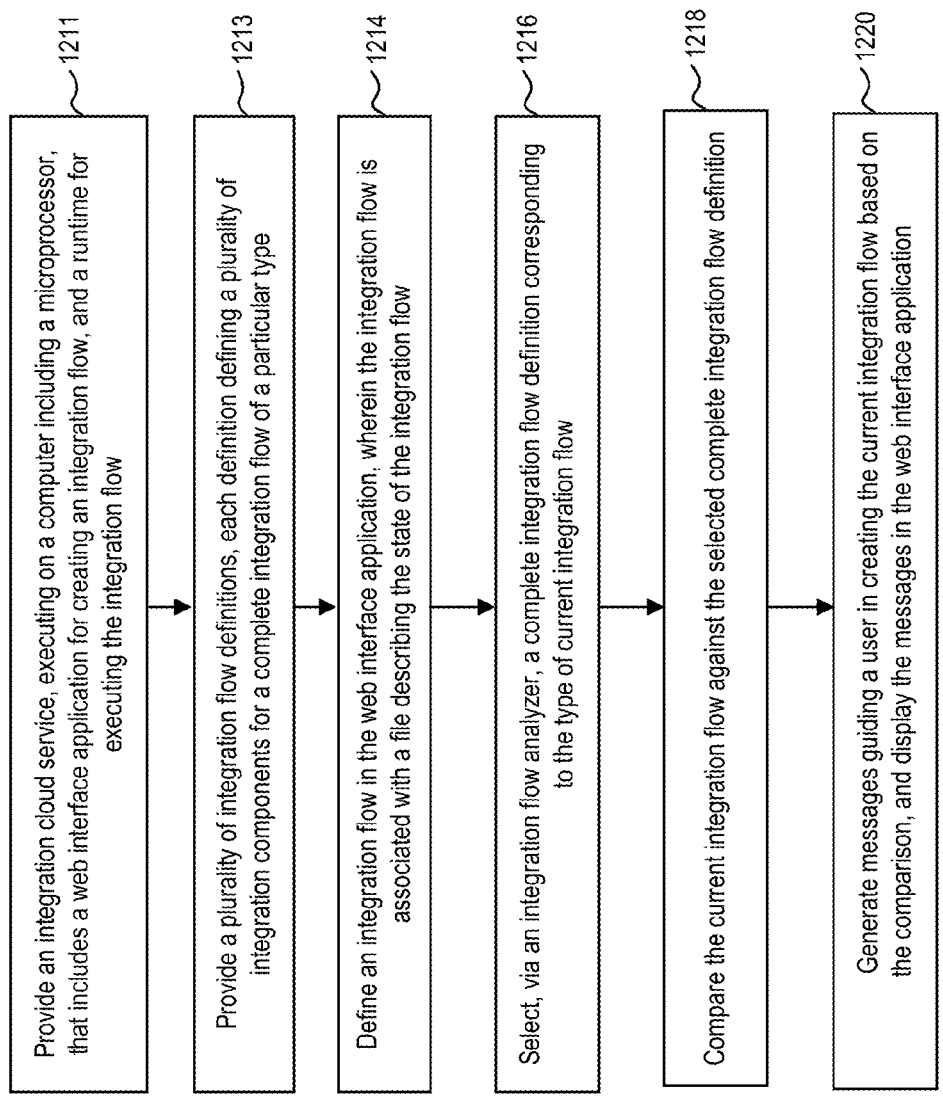
FIG. 12 illustrates a method for graphically displaying guiding messages for completing an integration flow in an ICS, in accordance with an embodiment.

FIG. 12 illustrates a method for generating messages guiding a user in creating an integration flow in an ICS design time, in accordance with an embodiment.

As shown in FIG. 12, at step 1211, an integration cloud service is provided on a computer including a microprocessor, wherein the integration cloud service includes a web interface application for creating a current integration flow, and a runtime for executing the integration flow.

At step 1213, a plurality of complete integration flow definitions are provided, each definition defining a plurality of required integration components for a complete integration flow of a particular type.

At step 1214, a current integration flow is defined in the web interface application, wherein the current integration flow is associated with a file describing the state of the current integration flow.

At step 1216, an integration flow analyzer selects a complete integration flow definition, based on the type of the current integration flow.

At step 1218, the integration flow analyzer compares the current integration flow against the selected complete integration flow definition.

At step 1220, the integration flow analyzer generates messages guiding a user in creating the current integration flow based on the comparison, and displays the messages in the web interface application.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for graphically displaying guiding messages for creating an integration flow in a cloud-based integration service, comprising:
    a computer including one or more microprocessors;
    a cloud service, executing on the computer, wherein the cloud service includes a web interface application for creating integration flows;
        a plurality of complete integration flow definitions, each complete integration flow definition defining a plurality of integration components for one of a plurality of different types of integration flows; and
        wherein the web interface application operates to
            display a user interface that receives input requests from a user to define an integration flow,
            receive a request from a user, via the user interface of the web interface application, to create a current integration flow of a particular type from within the plurality of different types of integration flows, wherein the current integration flow is associated with a current integration flow definition,
            select from the plurality of complete integration flow definitions a complete integration flow definition corresponding to the current integration flow,
            save an integration component defined in the user interface of the web interface application to a definition file associated with the current integration flow definition,
            in response to saving the integration component to the definition file associated with the current integration flow definition, update the current integration flow definition, and generate one or more messages indicating one or more additional integration components that are required to complete the particular type of integration flow, by comparing the updated current integration flow definition against the complete integration flow definition corresponding to the current integration flow, and,
            display the one or more messages to the user in the user interface of the web interface application.

2. The system of claim 1, wherein the one or more messages includes information showing where to drag and drop an integration component.

3. The system of claim 1, wherein each of the plurality of complete integration flow definitions is an extensible markup language file.

4. The system of claim 1, wherein the plurality of types of integration flows include a data mapping integration flow, a publishing integration flow, and a subscribing integration flow.

5. The system of claim 1, wherein the one or more messages are displayed together with a completeness indicator when the user clicks on a save button.

6. A method for graphically displaying guiding messages for creating an integration flow in a cloud-based integration service, wherein the cloud service a web interface application for creating integration flows, and a plurality of complete integration flow definitions, each complete integration flow definition defining a plurality of integration components for one of a plurality of different types of integration flows, the method comprising:
    displaying a user interface that receives input requests from a user to define an integration flow;
    receiving, via the user interface of the web interface application, a request from a user to create a current integration flow of a particular type from within the plurality of different types of integration flows, wherein the current integration flow is associated with a current integration flow definition;
    selecting, by the web interface application, a complete integration flow definition corresponding to the current integration flow;
    saving an integration component defined in the user interface of the web interface application to a definition file associated with the current integration flow definition;
    in response to saving the integration component to the definition file associated with the current integration flow definition, updating the current integration flow definition, and generating one or more messages indicating one or more additional integration components that are required to complete the particular type of integration flow by comparing the updated current integration flow definition against the complete integration flow definition corresponding to the current integration flow; and displaying the one or more messages to the user in the user interface of the web interface application.

7. The method of claim 6, wherein the one or more messages includes information showing where to drag and drop an integration component.

8. The method of claim 6, wherein each of the plurality of complete integration flow definitions is an extensible markup language file.

9. The method of claim 6, wherein the plurality of types of integration flows include a data mapping integration flow, a publishing integration flow, and a subscribing integration flow.

10. The method of claim 6, wherein the one or more messages are displayed together with a completeness indicator when the user clicks on a save button.

11. A non-transitory computer-readable storage medium storing a set of instructions for graphically displaying guiding messages for creating an integration flow in a cloud-based integration service, wherein the cloud service a web interface application for creating integration flows, and a plurality of complete integration flow definitions, each complete integration flow definition defining a plurality of integration components for one of a plurality of different types of integration flows, said instructions, when executed by one or more processors, causing the one or more processors to perform the steps comprising:

displaying a user interface that receives input requests from a user to define an integration flow;

receiving, via the user interface of the web interface application, a request from a user to create a current integration flow of a particular type from within the plurality of different types of integration flows, wherein the current integration flow is associated with a current integration flow definition;

selecting, by the web interface application, a complete integration flow definition corresponding to the current integration flow;

saving an integration component defined in the user interface of the web interface application to a definition file associated with the current integration flow definition;

in response to saving the integration component to the definition file associated with the current integration flow definition, updating the current integration flow definition, and generating one or more messages indicating one or more additional integration components that are required to complete the particular type of integration flow by comparing the updated current integration flow definition against the complete integration flow definition corresponding to the current integration flow; and displaying the one or more messages to the user in the user interface of the web interface application.

12. The non-transitory computer-readable storage medium of claim 11, wherein the one or more messages includes information showing where to drag and drop an integration component.

13. The non-transitory computer-readable storage medium of claim 11, wherein each of the plurality of complete integration flow definitions is an extensible markup language file.

14. The non-transitory computer-readable storage medium of claim 11, wherein the plurality of types of integration flows include a data mapping integration flow, a publishing integration flow, and a subscribing integration flow.

15. The non-transitory computer-readable storage medium of claim 11, wherein the plurality of types of integration flows include a data mapping integration flow, a publishing integration flow, and a subscribing integration flow.

16. The system of claim 5, wherein the complete indicator indicates a level of completeness of the current integration flow.

17. The method of claim 10, wherein the complete indicator indicates a level of completeness of the current integration flow.

18. The non-transitory computer-readable storage medium of claim 11, wherein the one or more messages are displayed together with a completeness indicator when the user clicks on a save button, and wherein the complete indicator indicates a level of completeness of the current integration flow.

* * * * *